Feb. 21, 1928. 1,659,646
F. R. WEISS
CIRCUIT TESTING DEVICE
Filed April 9, 1925
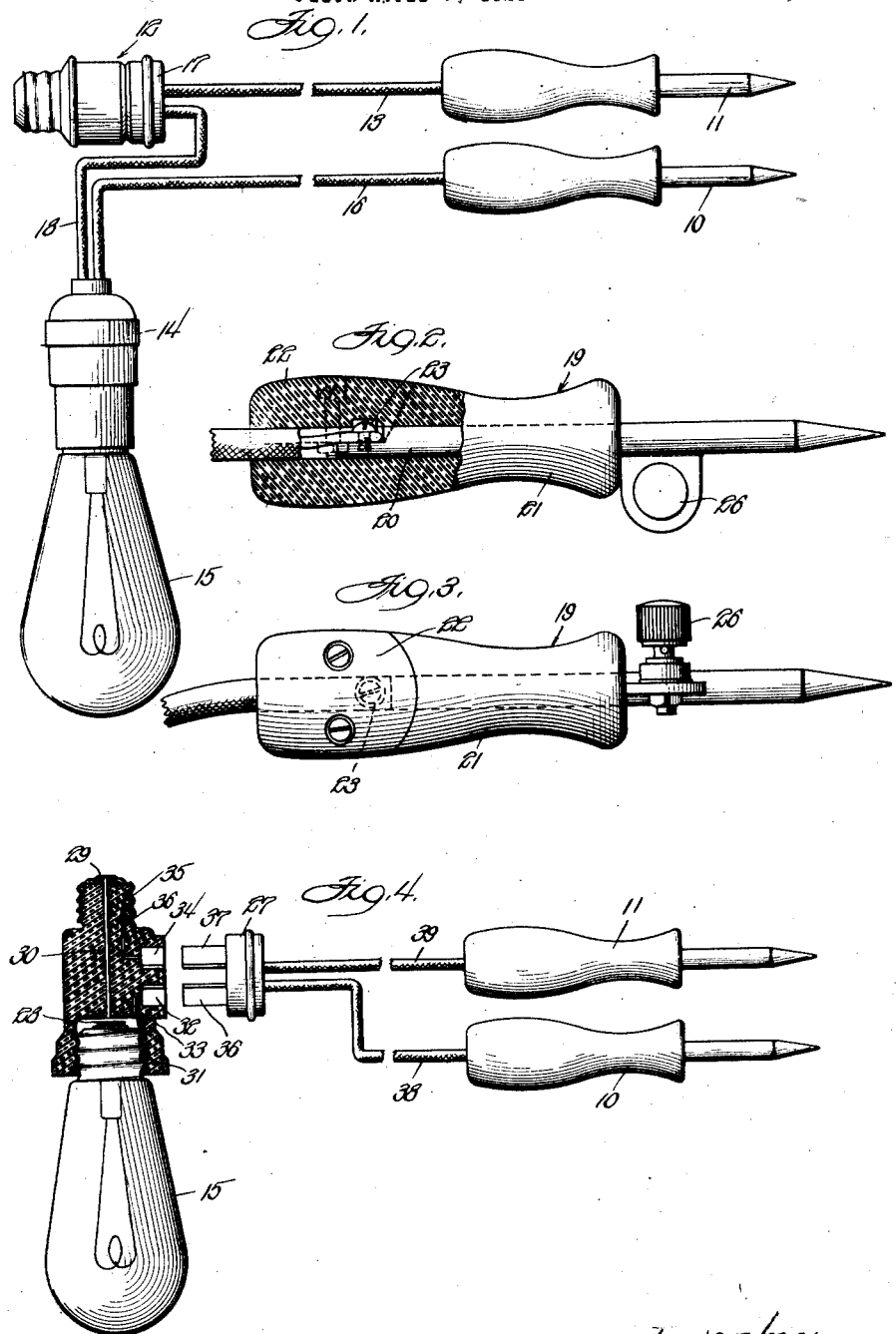
Inventor:
Fred R. Weiss Patented Feb. 21, 1928.

1,659,646

UNITED STATES PATENT OFFICE.

FRED R. WEISS, OF CHICAGO, ILLINOIS, ASSIGNOR TO UNIVERSAL TEST EQUIPMENT COMPANY, OF CHICAGO, ILLINOIS, A CORPORATION OF ILLINOIS.

CIRCUIT-TESTING DEVICE.

Application filed April 9, 1925. Serial No. 21,800.

My invention relates to circuit testing devices.

One of the objects of my invention is to provide an improved circuit testing device having means whereby the user can plug into an ordinary outlet for supplying current through the indicating device, testing points and the part of the circuit to be tested.

A further object of my invention is to provide an improved insulating handle for the testing point.

A further object is to provide an improved testing point having a binding terminal on the projecting point.

Further objects will appear from the description and claims.

In the drawings, in which two forms of my invention are shown—

Figure 1 is a somewhat diagrammatic view showing the testing points, plug and indicator;

Fig. 2 is an enlarged view of the testing point and handle, parts being in section to show the interior construction;

Fig. 3 is a top view of the construction shown in Fig. 2; and

Fig. 4 is a somewhat diagrammatic view showing a different form of the circuit testing device.

Referring to the drawings in detail and first to Figs. 1, 2 and 3, the construction shown therein comprises the two testing points 10 and 11 which are applied to the part of the circuit to be tested, a separable attachment plug 12 to which one of the testing points is connected by means of the conductor 13, and a lamp socket 14 for the indicating lamp 15, having one of its terminals connected to the testing point 10 by means of the conductor 16 and having its other terminal connected to the attachment plug 17 by means of the conductor 18.

With this construction, the user can insert the plug into any ordinary receptacle and by applying the testing points 10 and 11 to the part of the circuit to be tested can determine the condition of the part of the circuit as to whether it is open, shorted or grounded.

The testing point and handle construction shown in Figs. 2 and 3 comprise a two-part insulating handle 19 having a testing rod 20 embedded in the main handle part 21, the handle parts being separable on an axial plane so that when the cover part 22 of the handle is removed a part of the testing rod will be exposed. This exposed part of the testing rod is provided with a binding screw 23 to which the end of the conductor 16 may be secured. The cover 22 is secured to the body 21 by means of screws 24 threaded into nuts 25 embedded in the body 21.

The point portion of the testing rod projecting from the insulating handle is provided with a binding screw 26 so that a circuit can be connected across from one testing point to the other, in which circuit any desired electrical device may be placed.

The construction shown in Fig. 4 comprises a plug receptacle having a plug portion for insertion into any ordinary outlet and having two receptacle portions, one to receive the cap 27 of a separable attachment plug to which the two testing points 10 and 11 are connected, and the other to receive the indicating lamp 15. The center contact 28 of the lamp receptacle is connected to the center contact 29 of the plug portion by the conductor 30 and the shell contact 31 of the lamp receptacle is connected to the cap receptacle contact 32 by means of the conductor 33. The other cap receptacle contact 34 is connected to the threaded shell contact 35 of the plug. The two testing points 10 and 11 are connected to the contact blades 36 and 37 of the cap by means of the flexible conductors 38 and 39.

The use of this construction is substantially the same as that shown in Fig. 1. The circuit is from the plug center contact 29 through the conductor 30, center contact 28, indicating lamp 15, shell contact 31, conductor 33, contact 32, contact blade 36, conductor 38, testing point 10, circuit to be tested, testing point 11, conductor 39, contact blade 37, socket contact 34 and conductor 36 to the threaded shell contact 35 of the plug portion. This construction has the advantage that the indicating lamp is not dragged around with the flexible conductor but remains in fixed position.

While I have shown but two forms of the invention, it is obvious that it may be embodied in other forms covered and defined by the appended claims.

Having described my invention what I claim as new and desire to secure by Letters Patent of the United States, is:

1. A testing point construction comprising a two-part insulating handle one of said parts being of molded material, a test rod molded into one of said parts and having a point projecting therefrom, said two part handle being separable on an axial plane to expose a portion of said testing rod, and a binding screw on the portion of the rod thus exposed having its axis transverse to the axis of the rod.

2. A testing point construction comprising an insulating handle, a testing rod mounted therein, having a testing point projecting therefrom, and a wiring terminal on said projecting portion.

In witness whereof, I have hereunto subscribed my name.

FRED R. WEISS.